(12) United States Patent
Rivera et al.

(10) Patent No.: US 6,464,745 B2
(45) Date of Patent: Oct. 15, 2002

(54) MINIPLEAT SYNTHETIC AIR FILTER ASSEMBLY

(75) Inventors: Samuel Rivera, Clarksville, TN (US); Simon D. Ladd, Hopkinsville, KY (US); Michelle Pritzkau, Hopkinsville, KY (US); Kent Mertz, Clarksville, TN (US); Markus Schmitt, Clarksville, TN (US)

(73) Assignee: Freudenberg Nonwovens Limited Partnership, Durham, NC (US)

( * ) Notice: Subject to any disclaimer, the term of this patent is extended or adjusted under 35 U.S.C. 154(b) by 0 days.

(21) Appl. No.: 09/771,096

(22) Filed: Jan. 26, 2001

(65) Prior Publication Data

US 2002/0100264 A1 Aug. 1, 2002

(51) Int. Cl.⁷ .............................................. B01D 46/10
(52) U.S. Cl. ........................... 55/497; 55/483; 55/500; 55/511; 55/521; 55/522; 55/DIG. 31
(58) Field of Search .................... 55/483, 490, 496, 55/497, 500, 509, 511, 521, 522, 529, DIG. 31; 160/381

(56) References Cited

U.S. PATENT DOCUMENTS

| | | | | |
|---|---|---|---|---|
| 2,111,448 A | * | 3/1938 | Hoffman | 55/DIG. 31 |
| 3,757,499 A | * | 9/1973 | Scott | 55/500 |
| 4,195,681 A | * | 4/1980 | Douglas et al. | 160/381 |
| 4,233,044 A | * | 11/1980 | Allan | 55/483 |
| 4,570,406 A | * | 2/1986 | DiFazio | 160/381 |
| 4,963,171 A | | 10/1990 | Osendorf | 55/355 |
| 5,145,500 A | * | 9/1992 | Nolen, Jr. | 55/DIG. 31 |
| 5,196,040 A | * | 3/1993 | Malloy et al. | 55/511 |
| 5,350,620 A | | 9/1994 | Sundet et al. | 428/172 |
| 5,364,458 A | * | 11/1994 | Burnett et al. | 55/496 |
| 5,397,632 A | | 3/1995 | Murphy, Jr. et al. | 428/284 |
| 5,468,529 A | | 11/1995 | Kwon et al. | 428/36.1 |
| 5,547,011 A | * | 8/1996 | Dotson et al. | 160/381 |
| 5,599,448 A | | 2/1997 | Spearman | 210/445 |
| 5,704,953 A | | 1/1998 | Stemmer | 55/483 |
| 5,743,927 A | | 4/1998 | Osendorf | 55/497 |
| 5,776,343 A | | 7/1998 | Cullen et al. | 210/483 |
| 5,840,094 A | | 11/1998 | Osendorf et al. | 55/497 |
| 5,922,096 A | | 7/1999 | Stemmer | 55/483 |
| 5,944,860 A | | 8/1999 | Mack et al. | 55/492 |
| 6,000,558 A | | 12/1999 | Proulx et al. | 210/486 |
| 6,007,596 A | * | 12/1999 | Rosen | 55/496 |
| 6,027,553 A | * | 2/2000 | Hirano et al. | 55/497 |
| 6,056,809 A | | 5/2000 | Chapman | 96/67 |
| 6,090,731 A | | 7/2000 | Pike et al. | 442/409 |
| 6,099,612 A | | 8/2000 | Bartos | 55/481 |
| 6,110,250 A | | 8/2000 | Jung | 55/522 |
| 6,126,708 A | | 10/2000 | Mack et al. | 55/502 |
| 6,143,047 A | * | 11/2000 | Jodoin et al. | 55/511 |
| 6,159,260 A | | 12/2000 | Hammes | 55/502 |
| 6,319,300 B1 | * | 11/2001 | Chen | 55/497 |

* cited by examiner

*Primary Examiner*—Duane Smith
*Assistant Examiner*—Jason M. Greene
(74) *Attorney, Agent, or Firm*—Weingarten, Schurgin, Gagnebin & Lebovici LLP

(57) ABSTRACT

A minipleat synthetic filter assembly is provided. The filter assembly includes a frame assembly and a section of pleated filter media mounted within the frame assembly. The frame assembly includes a plurality of corner members and an equal plurality of side members interconnecting the corner members. The frame assembly may be made in any desired size and shape to accommodate a wide variety of applications. The section of filter media is a sheet of a synthetic nonwoven material folded to form minipleats having a spacing between adjacent peaks of no greater than 20 mm.

18 Claims, 5 Drawing Sheets

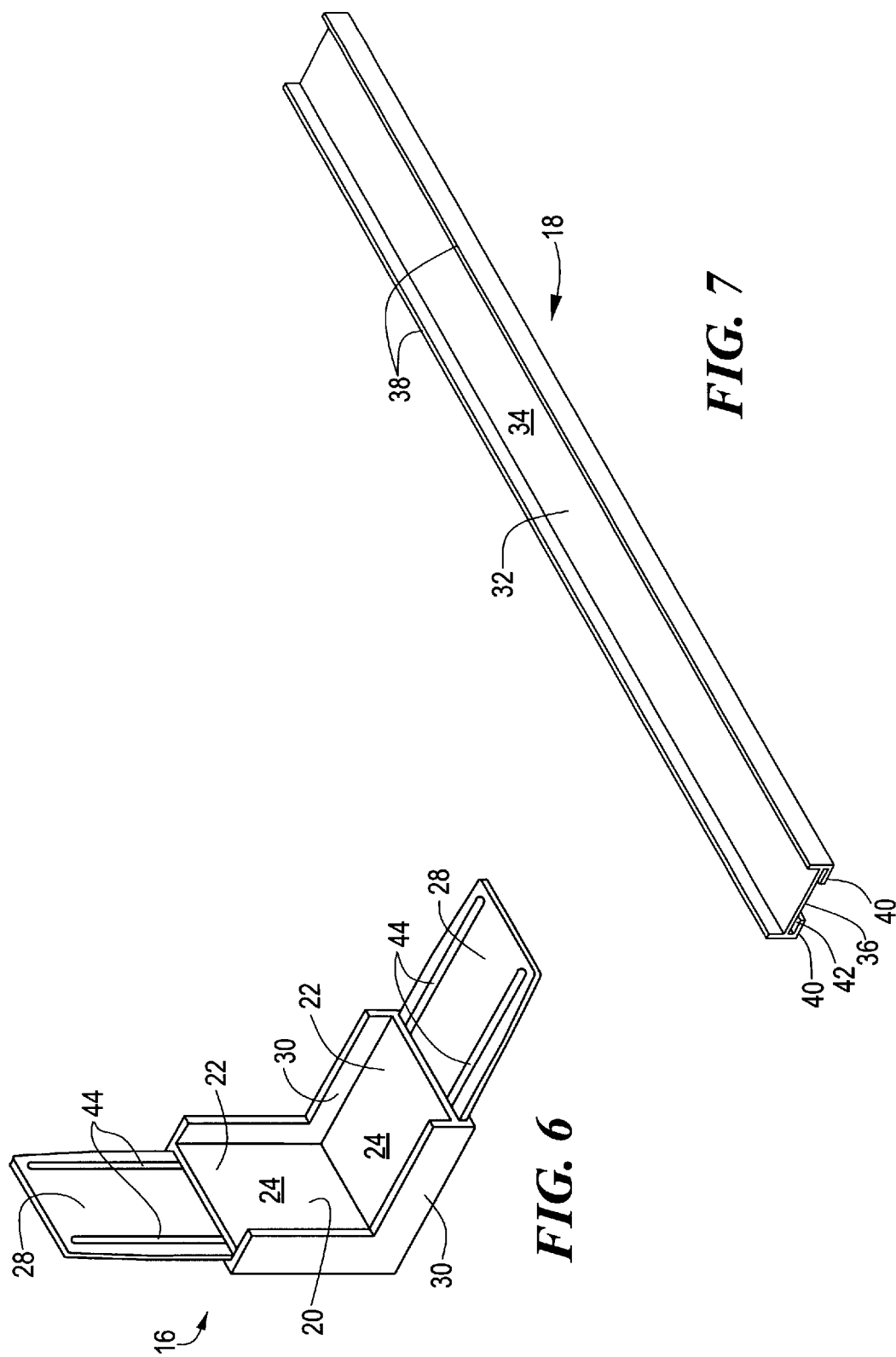

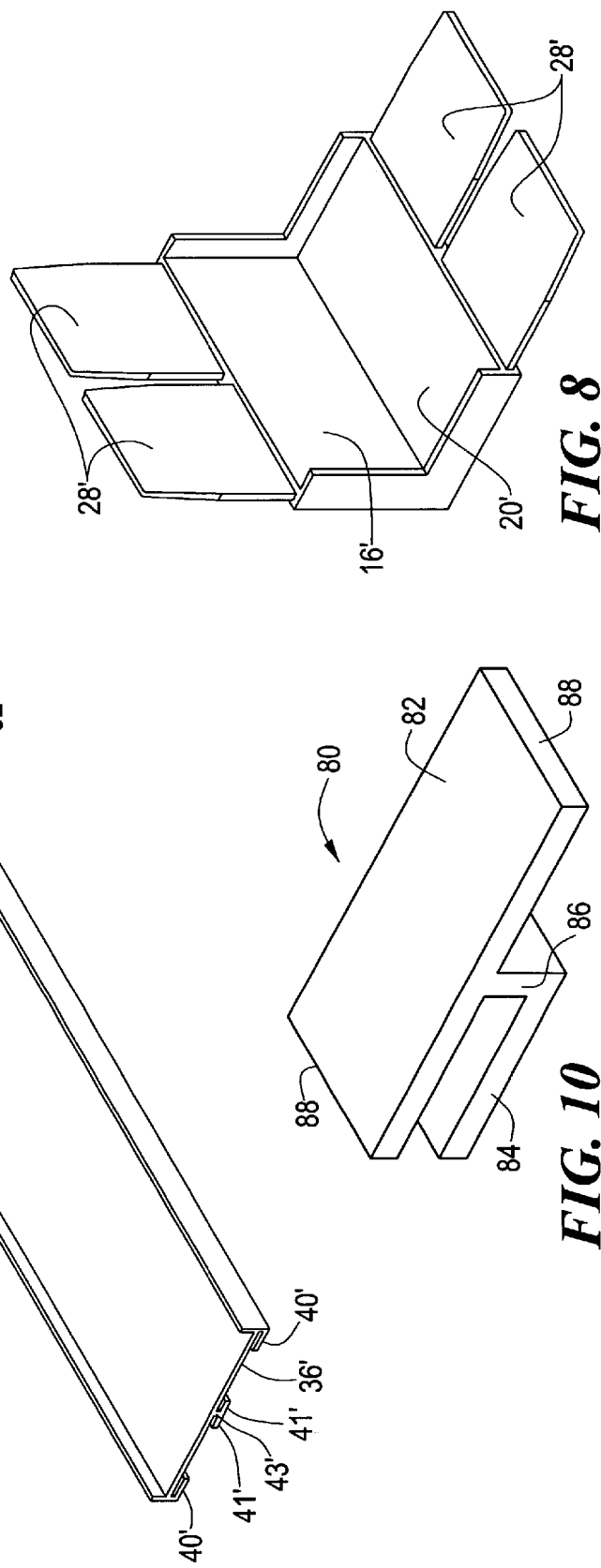

MINIPLEAT SYNTHETIC AIR FILTER ASSEMBLY

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

Air filters for prefiltration and final filtration for HVAC and general equipment protection can take many forms, depending on the particular application. One type of filter is a pleated filter, which is formed from a sheet of filter media folded into a series of pleats. One type of pleated filter, known as a minipleat filter, has smaller, closely spaced pleats. The peaks between adjacent pleats of a minipleat filter are spaced no more than 20 mm apart and typically range from 5.0 mm to 7.5 mm apart.

A pleated filter can be made from a variety of media. The size of the filter, however, affects the choice of media. For example, for a minipleat filter, fiberglass is a suitable material. Synthetic filter media have generally not been used in minipleat filters.

Glass media such as fiberglass, however, has several disadvantages. Glass media is difficult to handle. An operator may get glass fibers in the skin, and the glass media can break easily if handled improperly or in humid environments. Also, glass media promotes microbial growth and is often inconsistent, having thick and thin spots.

SUMMARY OF THE INVENTION

The present invention provides a pleated filter assembly that is readily manufactured in any desired size and shape to accommodate a wide variety of filtering applications. The filter assembly uses a synthetic nonwoven filter media that can be formed with miniature pleats or minipleats, having a spacing between peaks of no greater than 20 mm. The filter assembly is particularly suitable for use in applications that require small filter assemblies.

More particularly, the filter assembly comprises a frame assembly and a section of filter media mounted within the frame assembly. The frame assembly comprises a plurality of corner members and an equal plurality of side members interconnecting the corner members. Each of the corner members comprises an angled member comprising two arms and a tongue protruding from each of the two arms. Each of the side members comprises an elongated member having a pair of opposed lips on an outer side of and at least at each end of the side member, to define a slot configured to receive the tongue of the corner member. Preferably, the corner members are injection molded and the side members are extrusions, which allow the frame assembly to be readily manufactured in any desired size and shape and readily assembled.

The section of filter media preferably comprises a sheet of a nonwoven synthetic material. The sheet is folded to form minipleats having a spacing between adjacent peaks of no greater than 20 mm. The filter media is attached to the side members of the frame, as with suitable adhesives, and the corner members and side members are assembled to form the finished filter assembly.

DESCRIPTION OF THE DRAWINGS

The invention will be more fully understood from the following detailed description taken in conjunction with the accompanying drawings in which:

FIG. 6 is a perspective view of a corner member of the filter assembly of FIG. 1;

FIG. 7 is a perspective view of a side member of the filter assembly of FIG. 1;

FIG. 8 is a perspective view of a doublewide corner member according to a further embodiment;

FIG. 9 is a perspective view of a doublewide side member according to the further embodiment of FIG. 8; and FIG. 10 is a joint member according to a still further embodiment of the present invention.

DETAILED DESCRIPTION OF THE INVENTION

Figure 1:
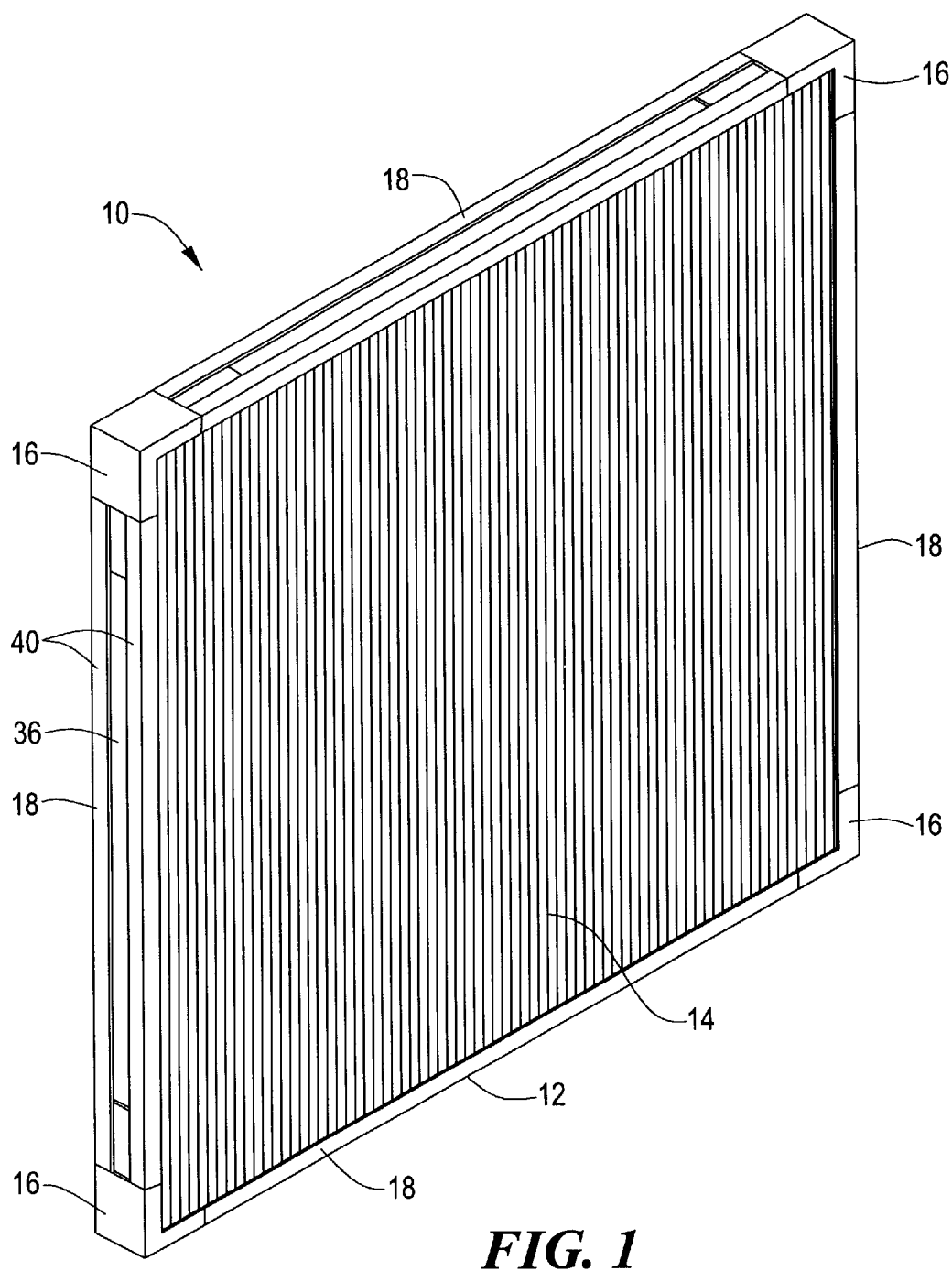
FIG. 1 is a perspective view of a filter assembly according to the present invention.
Figures 2, 3, 4:
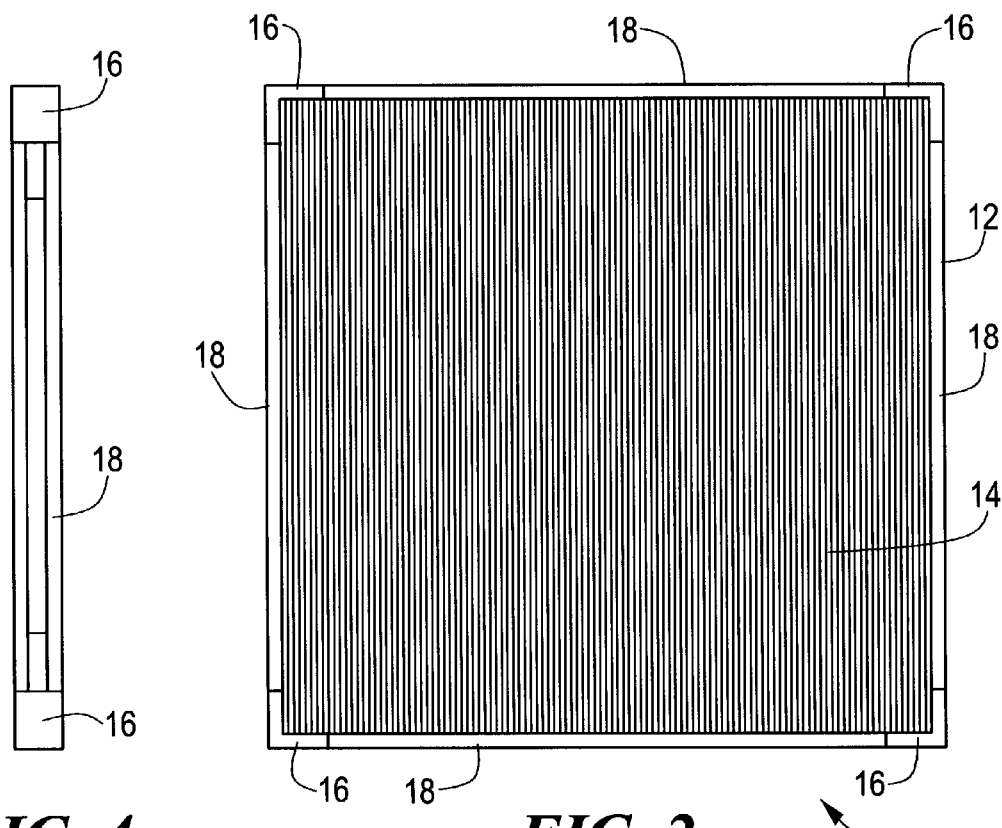
FIG. 2 is a front view of the filter assembly of FIG. 1.
FIG. 3 is a top view of the filter assembly of FIG. 1.
FIG. 4 is a side view of the filter assembly of FIG. 1.

A minipleat synthetic filter assembly 10 of the present invention is illustrated in FIGS. 1–5. The filter assembly includes a frame assembly 12 and a section of synthetic minipleat filter media 14 mounted within the frame assembly. The filter assembly of the present invention is typically used in air filtration applications, such as HVAC applications, although other filtration applications may also utilize the present filter assembly.

The frame assembly 12 is square or rectangular and formed of four corner members 16 and four side members 18 that interconnect the corner members, typically in a generally rectangular configuration. Referring more particularly to FIG. 6, each corner member 16 comprises an angled member 20 having two arms 22. Each arm has an inner face 24 and an outer face 26 (see also FIG. 5). In the preferred embodiment, the arms 22 of the angled member 20 form a 90° angle, although other angles and other numbers of corner members and side members are possible. A tongue 28 projects from each arm 22 of the angled member 20. Side walls 30 extend from the inner face 24 of the arms 22 of the angled member 20 to provide a channel within which the section of filter media 14 rests.

Figure 5:
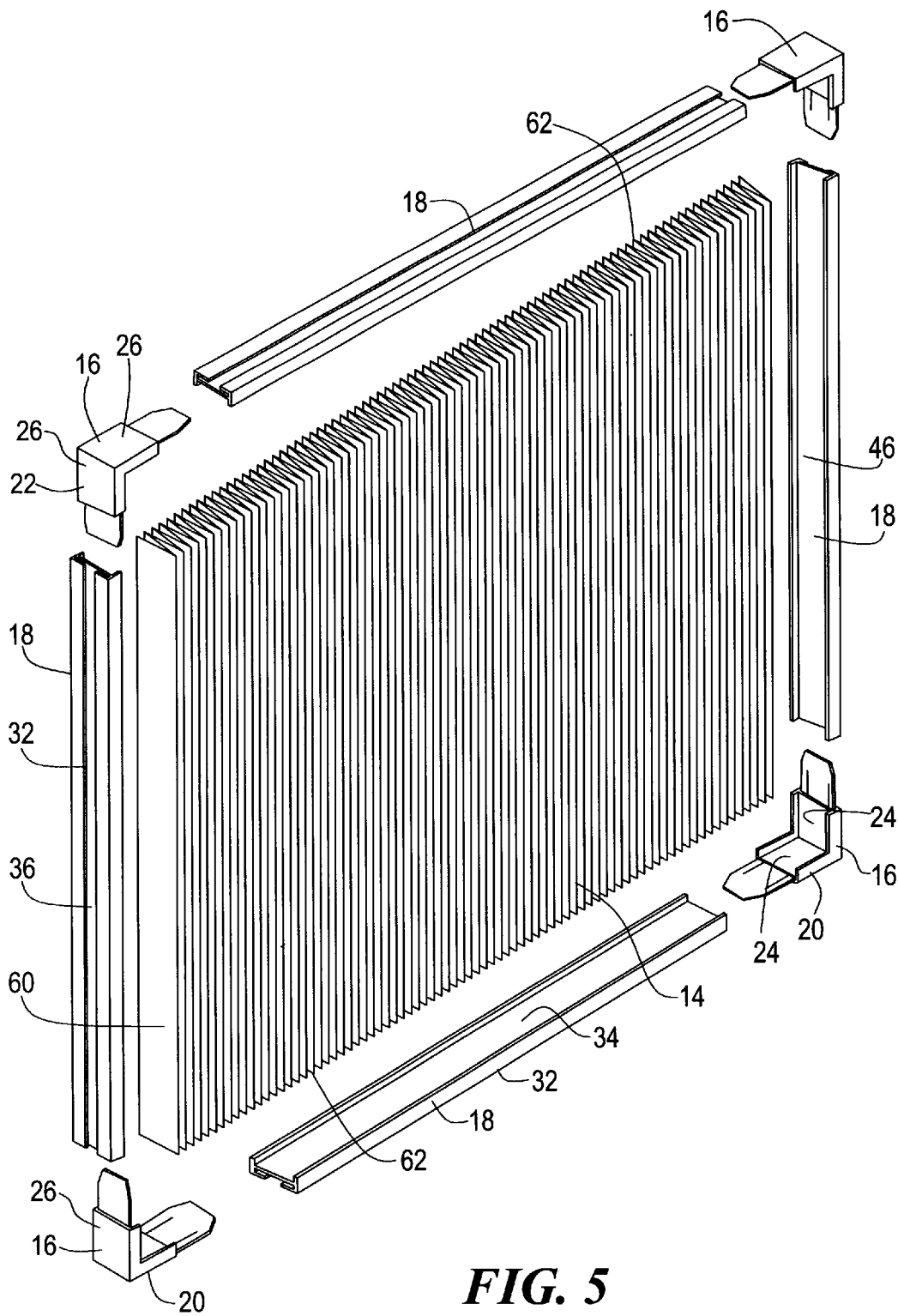
FIG. 5 is an exploded view of the filter assembly of FIG. 1.

Referring more particularly to FIG. 7, each side member 18 comprises an elongated strip 32 having an inner face 34 and an outer face 36 (see also FIG. 5). Side walls 38 extend from the inner face 34 of the strip 32 along both edges to provide a channel within which the section of filter media 14 rests. The side walls 38 also extend from the outer face 36 a small distance, and two lips 40 or flanges extend inwardly from the side walls 38. The lips 40 and the outer face 36 of the elongated strip 32 define a narrow slot 42 therebetween. In assembly, the tongue 28 of a corner member 16 fits within the slot 42 of a side member 18 and is frictionally retained therein. In this manner, four corner members 16 and four side members 18 can be assembled to form the frame assembly 12. Each tongue 28 may include one or more ribs 44 thereon to assist in frictionally engaging the outer face 36 of the side members and in stiffening the structure.

The corner members 16 are formed from a suitable plastic material, such as polystyrene, in any suitable manner, such as by injection molding. The corner members provide overall stiffness to the frame. The side members are also formed from a suitable plastic material, such as polystyrene, in any suitable manner, such as by extrusion. Extrusions allow the frame assembly 12 to be readily made in any desired size. It will be appreciated that the frame assembly may be formed in any polygonal shape as well, such as triangular or hexagonal, by varying the angle of the angled member and the number of corner members and side members.

The section of minipleat filter media 14 is mounted within the frame assembly 12 in any suitable manner. For example, a double-sided adhesive tape 46 may be applied along the inside face 36 of two opposing side members 18. The flat side faces 60 at the edges of the pleated filter media are adhered to the outwardly facing surface of the tape 46. A polyurethane adhesive is then applied within the channel along the inside faces 34 of the remaining two opposing side members 18. The edges 62 of the pleated filter media forming a row of V shapes are pressed into the polyurethane adhesive. If desired, a narrow band (not shown) may be glued or otherwise affixed across the pleats to assist in maintaining an even pleat spacing. The side members 18 are connected with the corner members 16, and the adhesive allowed to set up or cure. The side walls 30 and 38 also form surfaces against which a gasket (not shown) may be sealed.

In an alternative embodiment, wider sections of filter media may be more easily accommodated within a double-wide frame assembly. Referring to FIGS. 8 and 9, the frame assembly is formed of four double-wide corner members 16' and four double-wide side members 18'. Each corner member comprises an angled member 20' and four protruding tongues 28'. Two tongues are adjacent to each other and protrude in the same direction. The side members 18' include two lips 41' or flanges extending from a rib 43' along the center line of the elongated strip 32'. The central lips 41' and their opposed outer lips 40' and the opposed outer face 36' of the elongated strip define two narrow slots in which two corresponding tongues 28' fit. The filter media may be fastened to the frame as discussed above.

To be considered a minipleat filter media, the spacing between peaks of adjacent pleats is no greater than 20 mm. In typical minipleat filter applications, the pleat spacing ranges from approximately 5 mm to approximately 7.5 mm. The pleat height also varies depending on the application. In typical applications the pleat height ranges from approximately 36 mm to approximately 92 mm. The minipleat filter media preferably comprises a synthetic nonwoven material. Suitable synthetic nonwoven filter media are available from Freudenberg Nonwovens under the VILEDON® trademark. The particular material is selected for desired filtering efficiency required for the particular application. Other media, such as glass media, may be used if desired.

In certain applications, a number of filter assemblies are placed side-by-side in a row to provide coverage over a larger area. When these filters are replaced, each filter assembly must be individually removed and then new filter assemblies individually placed back into position. In another aspect of the present invention, a joint device 80 is provided to connect a number of filter assemblies in a row and/or column. The joint device includes a long leg 82 and a short leg 84 connected by a bridging member 86. Preferably, the joint device is formed as a unitary member by injection molding. In use, the long leg 82 is placed lengthwise between and parallel with the two lips 40 on the outer face 36 of a side member 18. The joint device 80 is then rotated 90° until the outer tips 88 of the long leg 82 are underneath and orthogonal to the lips 40. The shorter leg 84 may then be inserted under one lip 40 of the side member 18 of an adjacent frame assembly. In this manner, two frame assemblies may be connected together such that pulling on a first frame assembly causes any connected frame assemblies to be pulled as well.

The invention is not to be limited by what has been particularly shown and described except as indicated by the appended claims.

What is claimed is:

1. A filter assembly comprising:
   a filter frame comprising a plurality of corner members and an equal plurality of side members interconnecting the corner members, wherein:
   each of the corner members comprises an angled member comprising two arms and a tongue protruding from each of the two arms;
   each of the side members comprises an elongated member having a slot at each end of the side member configured to receive the tongue of the corner member, the slots defined on an outer surface of the side member; and
   each of the corner members and the side members includes opposed side walls extending from an inner surface to provide
   a filter receiving channel; and
   a filter section comprising a sheet of pleated filter media mounted within the filter frame.

2. The filter assembly of claim 1, wherein the plurality of corner members and the equal plurality of side members are four.

3. The filter assembly of claim 1, wherein the angled member is angled at 90°.

4. The filter assembly of claim 1, wherein the tongue includes one or more ribs thereon to engage the outer surface of the side member.

5. The filter assembly of claim 1, wherein the corner members comprise a plastic material.

6. The filter assembly of claim 1, wherein the corner members comprise a polystyrene.

7. The filter assembly of claim 1, wherein the corner members comprise injection molded members.

8. The filter assembly of claim 1, wherein the side members comprise a plastic material.

9. The filter assembly of claim 1, wherein the side members comprise a polystyrene.

10. The filter assembly of claim 1, wherein the side members comprise extrusions.

11. The filter assembly of claim 1, wherein the slots on each side member are defined by a pair of opposed lips on the outer surface of the side member.

12. The filter assembly of claim 1, wherein:
    the corner members include a second tongue protruding from each of the two-arms; and
    the side members include a second slot next to the slot, the slot and the second slot defined by a pair of opposed lips along outer edges and on an outer side of the side member, and a pair of central lips along a center line and on the outer side of the side member.

13. The filter assembly of claim 1, further comprising a joint member configured to attach the filter assembly to a further filter assembly.

14. The filter assembly of claim 13, wherein the joint member comprises a leg sized to fit within the slot of the side member and a shorter leg sized to fit within a slot of an adjacent side member.

15. The filter assembly of claim 1, wherein the sheet of filter media comprises pleats having a spacing between adjacent peaks of no greater than 20 mm.

16. The filter assembly of claim 1, wherein the sheet of filter media comprises pleats having a spacing between adjacent peaks ranging from approximately 5 mm to approximately 7.5 mm.

17. The filter assembly of claim 1, wherein the sheet of filter media comprises a nonwoven synthetic material.

18. The filter assembly of claim 1, wherein the sheet of pleated filter media comprises a minipleat filter media.

* * * * *

UNITED STATES PATENT AND TRADEMARK OFFICE
CERTIFICATE OF CORRECTION

PATENT NO.     : 6,464,745 B2
DATED          : October 15, 2002
INVENTOR(S)    : Samuel Rivera et al.

It is certified that error appears in the above-identified patent and that said Letters Patent is hereby corrected as shown below:

Column 1,
Line 23, "than20" should read -- than 20 --; and

Column 4,
Line 45, "two-arms" should read -- two arms --.

Signed and Sealed this

Twenty-first Day of October, 2003

JAMES E. ROGAN
*Director of the United States Patent and Trademark Office*